Figure 1:
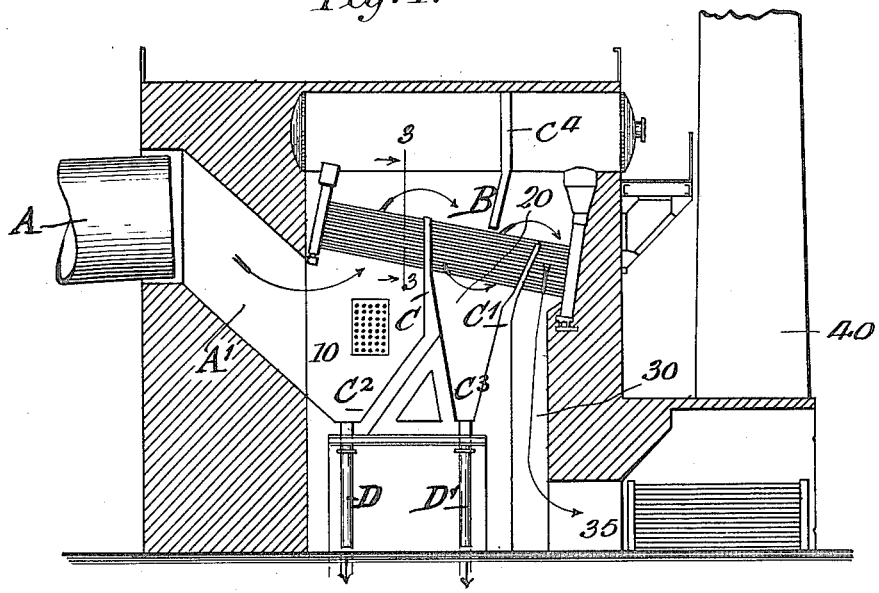

F. SCHOTT.
APPARATUS FOR UTILIZING THE WASTE GASES OF PORTLAND CEMENT, LIME, AND OTHER KILNS.
APPLICATION FILED DEC. 30, 1912.

1,234,396.

Patented July 24, 1917.

Witnesses:
John Murtagh
F. Hogg

Inventor
Friedrich Schott
By his Attorneys
Goepel & Goepel

UNITED STATES PATENT OFFICE.

FRIEDRICH SCHOTT, OF HEIDELBERG, GERMANY.

APPARATUS FOR UTILIZING THE WASTE GASES OF PORTLAND-CEMENT, LIME, AND OTHER KILNS.

1,234,396.     Specification of Letters Patent.     Patented July 24, 1917.

Application filed December 30, 1912. Serial No. 739,284.

*To all whom it may concern:*

Be it known that I, FRIEDRICH SCHOTT, a citizen of the Empire of Germany, residing in Heidelberg, Grand Duchy of Baden, in said Empire, have invented certain new and useful Improvements in Apparatus for Utilizing the Waste Gases of Portland-Cement, Lime, and other Kilns, of which the following is a specification.

This invention relates to an improved apparatus for utilizing the waste-gases of Portland cement, lime and other kilns for the generation of steam, and incidentally thereto for separating the dust carried along by the same, so as to prevent the objectionable depositing of dust in the vicinity of these kilns.

Many attempts were heretofore made for utilizing the heat of the waste-gases of the kilns referred to for generating steam in steam-boilers located near the outgoing end of the kiln. These attempts, however, were unsuccessful, as the water-tubes of the steam-boiler, as well as the flues by which the hot waste-gases are conducted to the boiler, are choked by the dust deposited therein, so that not only the generation of steam in the boiler was impaired, but also the draft exerted on the waste-gases diminished and the carrying off of the same to a considerable extent prevented.

The object of this invention is to furnish an apparatus by which the dust is removed from the waste-gases of the kiln, so that they do not choke up the flues leading to and the spaces around the water-tubes of the steam-boiler, so that the effective generation of steam in a steam-boiler connected with the kiln is rendered possible; and for this purpose the invention consists of an apparatus for utilizing the waste-gases of Portland cement, lime and other calcination kilns for the generation of steam in a steam-boiler located adjacent to the kiln and connected with the kiln by a downwardly-inclined flue or conduit, and separating at the same time the dust carried along by the waste-gases by means of baffle-plates extending at both sides around the boiler, so as to collect the dust and prevent its delivery into the atmosphere. The invention consists further of certain details of construction which will be fully described hereinafter and finally pointed out in the claims.

Reference is hereby made to my copending application for Letters Patent of the United States, Serial No. 739,285, filed December the 30th, 1912, in which copending application the structure described herein is disclosed, as well as additional cooling and filtering chambers for removing volatile products from the waste-gases, after the dust and heat have been abstracted therefrom by an apparatus similar to that disclosed in this application.

Figure 2:
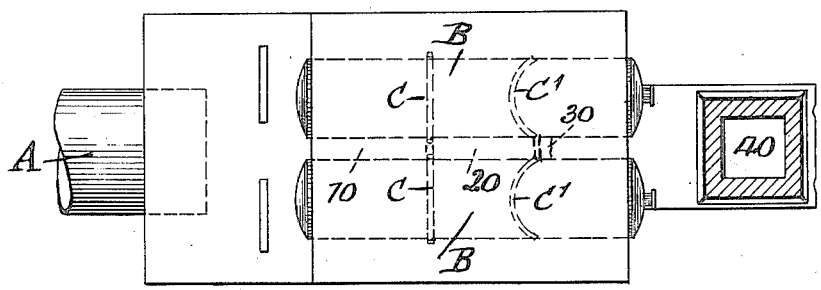
Figure 3:
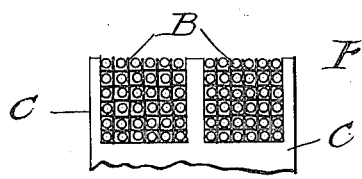

In the accompanying drawings,

Figure 1 represents a side-elevation of my improved apparatus for utilizing the waste-gases of Portland cement, lime and other kilns for the generation of steam, Fig. 2 is a plan-view of the same and Fig. 3 is a detail vertical section through the steam-generator on line 3, 3, Fig. 1.

Similar letters of reference indicate corresponding parts in the figures of the drawings.

Referring to the drawings, A represents the rotary drum of a Portland cement, lime or other calcination kiln. $A^1$ represents a downwardly-inclined flue through which the waste-gases are conducted from the outgoing end of the kiln to a steam-generator B, preferably a water-tube boiler, which is supported above the outgoing end of the downwardly-inclined flue $A^1$. In the space below the water-tubes of the steam-generator B are arranged two baffle-plates—a primary baffle-plate C, which extends in upward direction at both sides of the front-portion of the water-tubes, and a secondary baffle-plate $C^1$, which extends also in upward direction at both sides of the rear-portion of the water-tubes. The primary baffle-plate C forms an upward flue 10 connecting the downward flue $A^1$ with the front section of the generator B. The baffle-plate $C^1$ separates the midsection of the steam generator from the rear end section thereof and forms a flue 20 between said baffle-plates and a downward flue 30 connecting the rear section of said steam generator through the opening 35 with the chimney 40. The primary baffle-plate C forms with the lower part of the inclined flue $A^1$ a hopper-shaped receptacle $C^2$, while between the baffle-plates C, $C^1$ a second hopper-shaped receptacle $C^3$ is formed. The interstices between the upper ends of the baffle-plates C, $C^1$ and the water-tubes are filled up with fire-brick, so that the waste-gases of combustion are compelled to pass from the flue A¹ first in upward direction around the rear-portion of the water-tubes, then in downward direction through the middle portion of the same, then along the secondary baffle-plate and over the same, then by means of any well known construction, as the baffle plate D⁴ in downward direction through the front-portion of the water-tubes, as shown by the arrows in Fig. 1, and then by means of a suitable chimney or any well known devices are safe into the atmosphere. At the lower end of the hopper-shaped receptacles C², C³ are arranged downwardly-inclined outlet-pipes D, D¹, through which the hot dust particles, which are separated by the baffle-plates in their passage through the water-tubes of the steam-boiler, are conducted off. The lower ends of the pipes D, D¹ are connected with suitable conveyers (not shown) for conducting off the dust particles delivered thereon.

By arranging the flue A¹ at a downward inclination and locating the water-tubes of the steam-boiler at a higher position above the outgoing end of the flue, and by compelling the waste-gases to take a circuitous course in passing around the water-tubes of the boiler, the highly heated dust particles can flow off continuously through the hopper-shaped receptacles and their outlet-pipes. The waste-gases are thereby enabled to part with the greater amount of their heat, which is utilized for the generation of steam in the water-tubes of the boiler. By the course of these waste-gases the coarser dust particles are collected first in the lower part of the primary hopper, then after their passage along and over the primary baffle-plate in the lower part of the secondary hopper, and the finer particles in the space between the second baffle-plate and the supporting front-wall of the steam-boiler, before the gases are passed over the water heater shown at the lower right-hand corner of Fig. 1 taken by the chimney and discharged to the atmosphere.

I claim:

1. An apparatus for generating steam by calcination gases comprising a calcining kiln delivery flue, a downward flue leading from said delivery flue, a steam generator chamber, a steam generator therein, a baffle-plate forming with said downward flue an inverted apex and an abrupt upward flue connecting said downward flue with one section of said steam generator, a deflector disposed above said baffle-plate, a flue connecting said generator chamber with the exhaust, a dust pocket at the junction of said downward and upward flues, and means for discharging the dust from said pocket.

2. An apparatus for generating steam by calcination gases comprising a calcining kiln delivery flue, a downward flue leading from said delivery flue, a steam generator chamber, a steam generator therein, a primary baffle-plate forming with said downward flue an inverted apex and an abrupt upward flue connecting said downward flue with one section of said steam generator, a supplemental baffle-plate separating the midsection of said generator from the rear section thereof, a flue passage between said baffle-plates, a downward flue between said supplemental baffle-plate and the rear end wall of said chamber, deflectors disposed above said baffle-plates, a dust collecting pocket at the junction of said downward and upward flues, a dust collecting pocket between said baffle-plates, and means for discharging dust from said pockets.

In testimony, that I claim the foregoing as my invention, I have signed my name in presence of two subscribing witnesses.

FRIEDRICH SCHOTT.

Witnesses:
PAUL ECK,
JOSEPH HEIFFER.